Nov. 7, 1950　　　C. R. STONE ET AL　　　2,528,919
SINK WASTE FITTING
Filed June 20, 1946　　　　　　　　　　　2 Sheets-Sheet 1
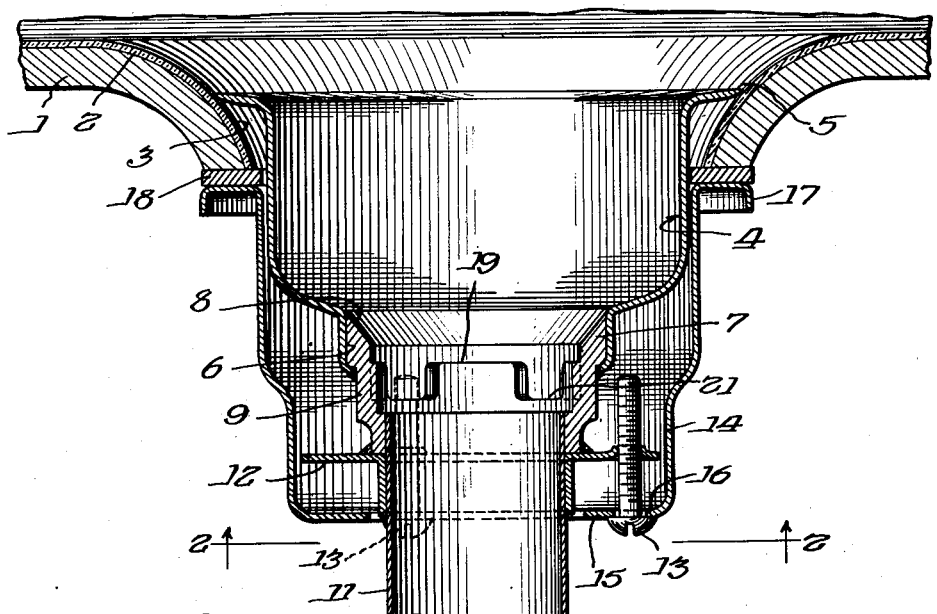
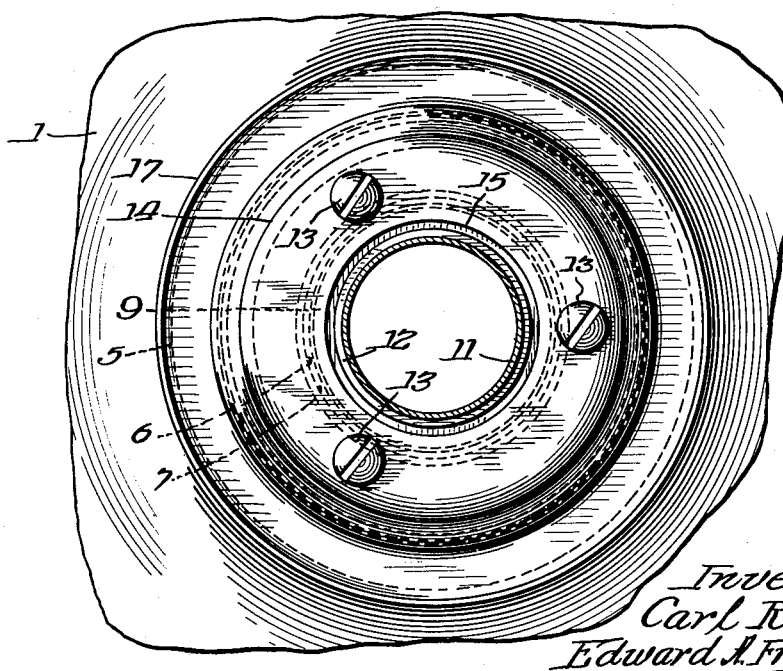
Inventors:
Carl R. Stone &
Edward A. Fredrickson,
By Joseph P. Lange, Atty.

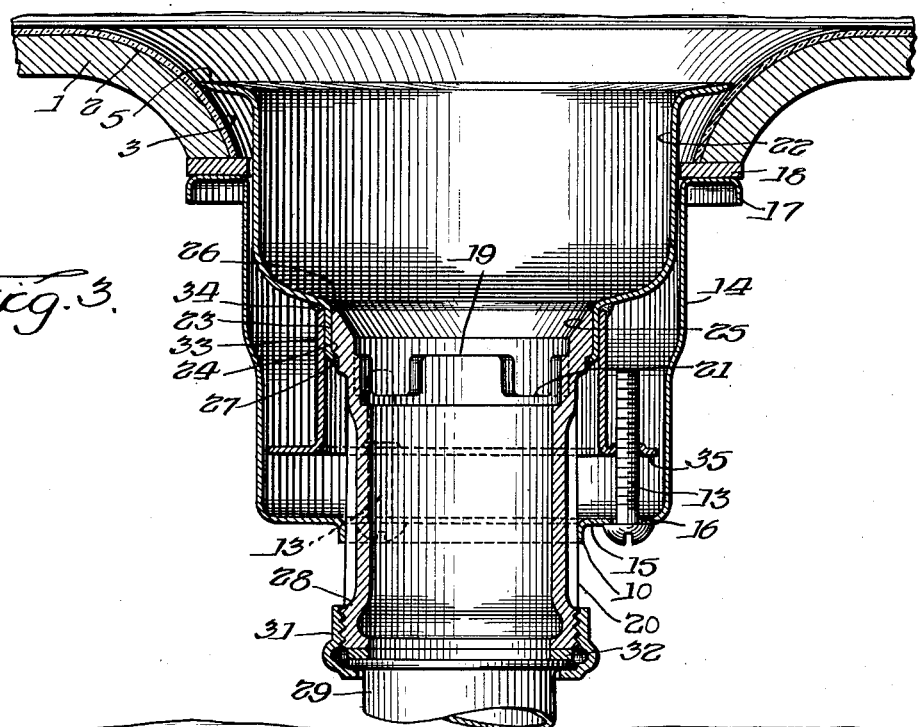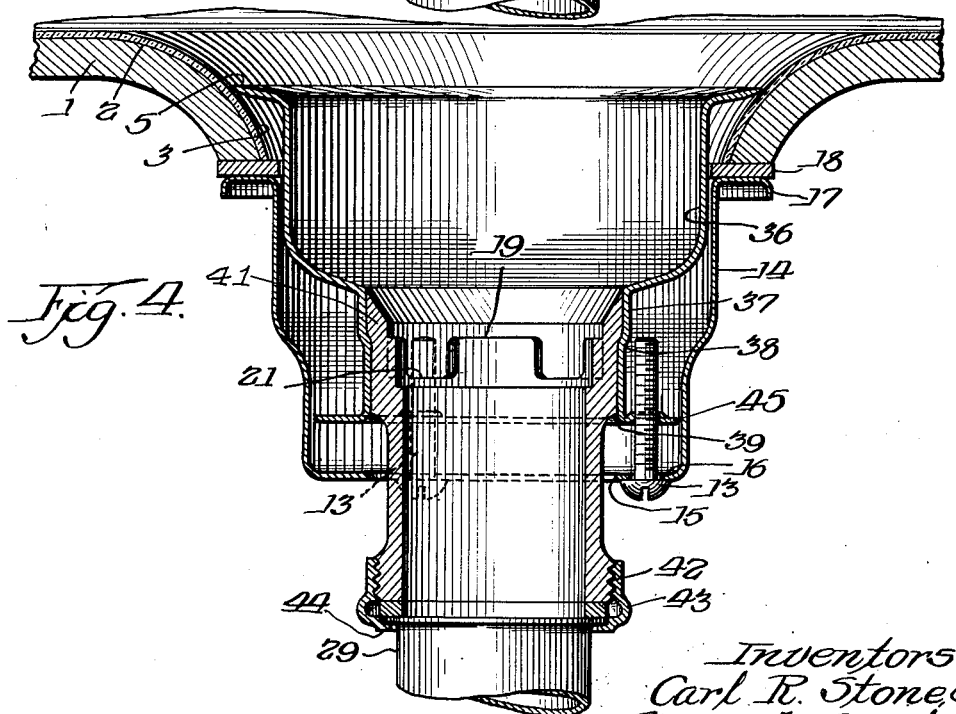

Patented Nov. 7, 1950

2,528,919

UNITED STATES PATENT OFFICE 2,528,919

SINK WASTE FITTING

Carl R. Stone and Edward A. Fredrickson, Chicago, Ill., assignors to Crane Co., Chicago, Ill., a corporation of Illinois Application June 20, 1946, Serial No. 678,046

3 Claims. (Cl. 285—37)

This invention is concerned with waste fittings or the like, and more particularly it relates to a waste fitting usually employed with a sink or similar fixture.

One of the more important objects of this invention is to provide a construction whereby the normal installation of a waste fitting to a sink is greatly simplified by eliminating the usual lock nut and gasket union connection.

To date there have been complaints that the present type of large lock nut employed in this type of installation is undesirable and in many cases the triple union waste connections do not seem to be justified. The unusually large lock nut necessarily used on this type of fitting in the past has been difficult to tighten as well as to loosen and it also required considerable space for the manipulation of a large wrench required to handle the lock nut, and of course in the cramped quarters beneath a sink it has been increasingly troublesome. Also general practice at present provides for three different union connections on the waste outlet thereby making the installation somewhat complicated to install, expensive and difficult to service when necessary.

In contrast to the difficulties heretofore experienced, the current contribution features simplicity, economy and ease of installation and maintenance. The relative simplified installation is obtained because only a small screwdriver vertically applied is required in attaching a complete waste fitting to the sink. With one union connection eliminated entirely, the chances of leakage are obviously reduced substantially.

Another important object is to provide a device of the character hereinafter described at length in which the parts are relatively lightweight and preferably made of pressed or forged materials, thereby avoiding the use of the previous costly castings.

A further important object is to provide a construction in which the valve seat for the waste plug is easily accommodated in pressure-tight relation to the sink cup and also in which the outer shell is conveniently guided during the course of effecting such seal.

Another object is to provide a structure in which the waste plug in combination may be immediately retained and maintained movable for subsequent inspection or replacement.

Other objects and advantages will become more apparent upon proceeding with the specification and read in light of the references to the drawings in which Fig. 1 is a fragmentary sectional assembly view of a preferred embodiment of the invention.

Fig. 2 is a sectional view taken on the line 2—2 of Fig. 1.

Fig. 3 is a fragmentary sectional view of a modified form of the invention.

Fig. 4 is a fragmentary sectional view of a further modified form.

Similar reference characters refer to like parts throughout the several views.

Referring to Fig. 1, the numeral 1 refers generally to the fragmentary portion of a sink structure provided with the usual vitreous enamel coating 2 and having the conventional tapering drain opening 3 within which a tubular form of cup member 4 is applied having its upper circular flange portion 5 supported upon the walls of the drain opening 3. At a lower portion of the cup member 4, a well 6 is provided within which the seat member 7 is closely positioned and is preferably held by an annular solder joint on its outer and lower periphery between the well and the seat, preferably having the frustoconical portion formed at 8 to receive a conventional drain plug (not shown). The lower portion of the well 6 is apertured to permit the projection therethrough of the lower extension 9 of the seat 7. The inner portion of the extension 9 is arranged to receive relatively closely the discharge or waste tubing 11 which is preferably attached by a solder connection to the member 7 to hold the tubing against rotational or axial displacement as well as to provide a fluid tight seal between tubing and seat. Fitted snugly around the outside of the tubing 11 and preferably attached by means of a solder connection is the flanged sleeve 12. The latter member may be attached to the seat extension 9 separately or to the tubular member 11 or both. The horizontally extending flanged annular portion of the member 12 is suitably tapped at annular spaced intervals to receive the screws 13. It should be noted that before positioning the latter screws in the flanged sleeve 12 as shown, a shell member 14 having an inwardly extending flanged portion 15 is placed over the assembly heretofore described. At its lowermost portion it is provided with complementary aligned apertures 16 to receive the screws 13, as shown more clearly in Fig. 2. At the upper end of the outer shell 14 an outwardly extending flange 17 is formed preferably integral therewith to support the gasket 18 for its compression contact with the lower portion of the sink 1 adjacent to the aperture 3.

The end of the tubing 11 is received within the seat member 7 as indicated. The latter member is provided with the annularly arranged projections 19 and the recessed portions 21. The purpose of the latter arrangement is to support the drain outlet plug (not shown) which normally seats on the annular surface 8 in a manner similar to that illustrated and described in U. S. Patent 2,263,537 granted November 18, 1941, to E. A. Fredrickson, thereby permitting the plug to be held in a raised position for drain purposes or in a seated position when fitted within the recesses 21 in order to allow water to be retained within the sink or lavatory for dishwashing purposes, bathing and the like.

Thus in operation it will be apparent that the connection between the waste fitting of our invention and the sink is easily maintained by simply tightening the screws 13 uniformly and thereby drawing the shell 14 tightly against the gasket 18 which is thus held between the lower annular ledge of the sink adjacent the drain opening 3 and the flange 17. It will be clear that a very effective method has been devised in providing for the attachment of a novel waste fitting to a plumbing fixture even in those installations in which space is limited.

Referring now to the modified construction shown in Fig. 3, the cup 22 is provided to bear against the sink surface in the usual manner and as described in connection with Fig. 1. At its lower portion it is also arranged with an integral extension 23 which is inwardly flanged as at 24 to support the seat 25, the latter member being held in sealed relation thereto preferably by means of the upper and lower annular solder connections at 26 and 27 respectively. The seat member 25 differs from the construction in Fig. 1 in that it is provided with the threaded tubular extension 28 for attachment of the usual tubing 29 by means of the union nut 31 and the interposed gasket 32. The latter extension may be dispensed with as a separate element by making the tubing 29 integral with the extended portion 28 rather than using a threaded connection as illustrated.

Depending from the lower end exterior portion of the extension 23 of the cup 22, is the flange 33 which is attached to the cup preferably by means of the annularly extending solder sealed connection 34. The lowermost portion of the flanged member 33 is provided with the outwardly extending flanged portion 35 tapped at predetermined spaced apart portions on the annular periphery to receive the screws 13. The shell 14 similarly provided with the flanged portion 17 is also arranged with the apertures 16 within which to shoulder the screws 13 and thereby compress the gasket 18, as described in connection with Fig. 1. For purposes hereinafter described, the lowermost portion of the shell 14 is preferably provided with the reduced annular extension 10. It has been found desirable, although not absolutely essential, to provide for convenient guiding of the outer shell 14 during the course of assembly and tightening. This is accomplished by arranging the integral longitudinally extending ribs 20 spaced apart radially around the outer periphery of the extended portion 28. These ribs are preferably made of a height sufficient to make a close sliding fit within the extension 10, which makes assembly and installation of the article more simple and easy.

A further modified construction is shown in Fig. 4 in which the cup 36 is made with the preferably integral extension 37 of stepped reducing diameter as indicated at the annular shoulder 38. A fluid sealing connection is preferably applied at 39. The latter shoulder supports the valve seat 41 which has a threaded extension 42 for coupling to the threaded union ring 43 and the gasket 44 interposed against the end of the flanged tubing 29. At the lower end portion of the extension 37 an annular flange 45 is provided which is tapped at spaced apart intervals to accommodate the screws 13, the latter being shouldered against the outer end of the shell 14 in the manner described in connection with Fig. 1 to thereby compress the gasket 18 between its flange 17 and the under annular portion of the sink aperture 3. Thus it will be apparent that in another simple and effective manner means are provided to support the valve seat 41 as well as to provide for fluid seal tightness between the waste fitting and the lower portion of the sink adjacent the outlet 3.

Thus from the several modifications suggested and illustrated, it should be apparent that the application of our invention may assume numerous forms. It is desired therefore to be limited only to the extent prescribed by the appended claims.

We claim:

1. In a waste outlet fitting, a cup-like member within an annular flange supportable within a drain opening, a valve seat within the cup member held against axial movement, the said seat having a downwardly extending portion with a lower depending tubing connected thereto, a flange member cooperating with the said cup-like member, an apertured shell enclosing respectively a substantial portion of the said seat, cup-like member and flange and having an upper annular member arranged to bear annularly around the drain opening, the said apertured shell being relatively closely guided annularly by the said cup-like member, a plurality of threaded attaching means annularly positioned to engage the said flange member, the threaded portion of said attaching means being concealed by said apertured shell, the means for actuating said attaching means engaging an outer end portion of said apertured shell to draw the latter member against the annular portion of the drain opening upon predetermined actuation of the said threaded attaching means.

2. In a sink waste fitting or the like, a hollow cup member secured within a drain opening, a seat within the cup member, said seat having a lower extending portion, a lower depending tubular member associated with said seat, a flange member cooperating with the said seat, a cylindrical shell having an upper flange outwardly extending to contact against the lower part of the sink adjacent the drain opening, sealing means interposed between said shell and the sink, the lower end of the said cylindrical shell being flanged inwardly and providing for a plurality of tightening means engageable with the said first named flange member to effect assembly with a sink, the means on the tightening means engageable with the said flange member being enclosed by the said shell and with an end actuating portion of said tightening means bearing against a transverse surface portion of the cylindrical shell, the actuating means of said tightening means being accessible from an end portion of said shell without removal of the latter member.

3. In a sink waste fitting or the like, a hollow cup member secured within a drain opening of the sink, an annular seat mounted in leakproof relation within the cup member, said seat having a lower extending portion, a lower depending tubular member connected with said seat, a flanged sleeve snugly fitted around the tubular member and connected with a lower end portion of the said seat, a substantially cylindrical outer shell having an upper flange outwardly extending to abut against the lower part of the sink immediately adjacent the drain opening, sealing means interposed between the abutting flange of said shell and the sink, the lower end of the said cylindrical outer shell being flanged inwardly and being provided with a plurality of annularly spaced-apart tightening means engageable with the said flanged sleeve member to effect assembly with the sink, the portion of the tightening means engageable with the said flange member being enclosed by the said outer shell, an end actuating portion of the said tightening means bearing against a transverse surface of the inwardly flanged portion of the outer shell, said actuating portion of the tightening means being accessible from an end portion of said outer shell.

CARL R. STONE.
EDWARD A. FREDRICKSON.

REFERENCES CITED

The following references are of record in the file of this patent:

UNITED STATES PATENTS

| Number    | Name     | Date          |
|-----------|----------|---------------|
| 2,225,693 | Frances  | Dec. 24, 1940 |
| 2,278,566 | Schaible | Apr. 7, 1942  |